United States Patent [19]

Westra

[11] 4,429,889

[45] Feb. 7, 1984

[54] STACKING CART

[75] Inventor: Dan P. Westra, Grand Haven, Mich.

[73] Assignee: The Challenge Machinery Company, Grand Haven, Mich.

[21] Appl. No.: 346,758

[22] Filed: Feb. 8, 1982

[51] Int. Cl.³ ............................................. B62B 3/10
[52] U.S. Cl. ............................ 280/79.1 A; 280/47.35; 211/50
[58] Field of Search ..................... 280/79.1 A, 79.1 R, 280/47.35, 47.34, 79.3; 211/50, 53, 55, 126

[56] References Cited

U.S. PATENT DOCUMENTS

| | | | |
|---|---|---|---|
| 27,784 | 9/1897 | Gander | 280/79.1 A |
| D. 165,194 | 11/1951 | Schiffer | 211/50 |
| 3,325,183 | 6/1967 | Elchuck | 280/79.1 A |
| 3,908,831 | 9/1975 | Brendgord | 211/126 |

FOREIGN PATENT DOCUMENTS 980834 1/1965 United Kingdom ............... 280/79.1

Primary Examiner—Joseph F. Peters, Jr.
Assistant Examiner—Joseph McCarthy
Attorney, Agent, or Firm—Price, Heneveld, Huizenga & Cooper

[57] ABSTRACT

A stacking cart for paper products, sheet material, or the like, is provided comprising a generally horizontally extending movable stand having four vertically oriented substantially identical, V-shaped troughs disposed thereon. The V-shaped troughs are each formed from a unitary sheet metal part with at least one wedge-shaped vertical flange. A plurality of generally horizontally extending shelves are disposed in the V-shaped troughs and fasteners extending through the vertically oriented flanges on the V-shaped troughs secure the troughs in a back-to-back relationship. Each of the troughs are inclined with respect to a centrally located vertical axis, with the tops of the troughs being disposed inwardly with respect to the bottom of the troughs so that sheets of material disposed on the horizontally extending shelves are gravity biased inwardly toward the centrally located vertical axis.

21 Claims, 9 Drawing Figures

4,429,889

STACKING CART

BACKGROUND OF THE INVENTION

The invention relates generally to stacking carts, and more particularly, to a novel construction for a stacking cart for paper products, sheet material, or the like.

Stack carts are well known in the prior art. Stack carts are found, for example, in commercial print shops and binding operations where large quantities of sheet material are collated and stacked. Since the paper products normally stacked on the cart are rectangular, generally four upright V-shaped troughs are provided with a plurality of generally horizontally extending shelves. Four vertical stacks of paper products are defined when the products are aligned and stacked on the horizontally extending shelves between the adjacent sidewalls of the V-shaped troughs. It is also common to provide the generally horizontally extending shelves with a slight downwardly and inwardly directed slope so that the paper products disposed on the shelves are gravity biased inwardly. While the function of such prior art stacking carts is generally satisfactory, their construction can be relatively complex and labor intensive. Also, problems can occur in certain operations that prior art stack carts are used for that stem from the fact that the somewhat canted or tilted shelves, which the sheet material is stacked on, are not orthogonal to the sidewalls of the V-shaped troughs.

SUMMARY OF THE INVENTION

According to the present invention, these and other problems in the prior art are solved by provision of a stacking cart for sheet material comprising a generally horizontally extending movable stand having four vertically oriented substantially identical troughs disposed thereupon. The four troughs are disposed on the horizontally extending stand in an upright, generally vertical fashion, and the sides of each trough define a generally V-shaped cross section. Each of the V-shaped troughs are formed from a unitary sheet metal part with at least one wedge-shaped vertically oriented flange. A plurality of generally horizontally extending shelves are disposed in the V-shaped troughs and means are provided for mounting the shelves so that they extend in a direction orthogonal to the sidewalls of the V-shaped troughs. Means are then provided for securing the V-shaped troughs in an upright back-to-back relationship on the horizontally extending stand, each of the V-shaped troughs being disposed in an inclined relationship with respect to a centrally located vertical axis. The angle of inclination of the troughs is defined by the wedge-shaped vertical flanges disposed on each trough. The troughs are inclined inwardly such that paper products disposed on the horizontally extending shelves are gravity biased inwardly toward the centrally located axis.

DESCRIPTION OF THE PREFERRED EMBODIMENTS

Figure 1:
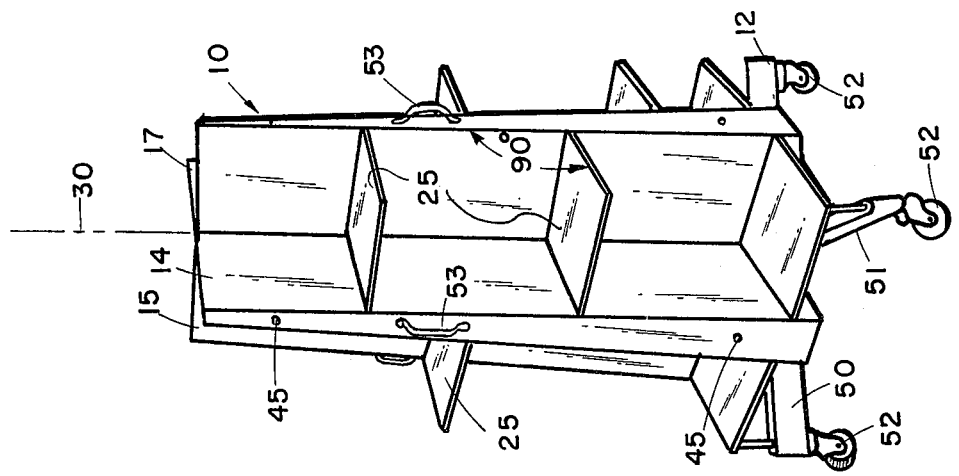
FIG. 1 is a perspective view of the stacking cart of the present invention.

With reference now to FIGS. 1 through 4, a stacking cart for paper products, sheet material, or the like, is generally indicated by the numeral 10. The stacking cart 10 comprises a generally horizontally extending movable stand 12 having a plurality of vertically oriented substantially identical troughs 14 through 17 disposed thereon. Each of the troughs is provided with first and second sides 20 and 21, respectively, defining a generally V-shaped cross section, best illustrated in FIGS. 8 and 9. A plurality of generally horizontally extending shelves 25 are provided, the shelves 25 being disposed within the V-shaped troughs 14 through 17 and mounted orthogonally with respect to the sidewalls of the V-shaped troughs. The shelves 25 are separately illustrated in FIGS. 5 and 6. Each of the V-shaped troughs 14 through 17 is a unitary member and is provided with means for securing the V-shaped troughs in a back-to-back relationship. Each of the V-shaped troughs are disposed in an inclined relationship with respect to a centrally located vertical axis 30. The top ends of the V-shaped troughs are inwardly disposed relative to the lower ends of the troughs such that paper products disposed on the horizontally extending shelves 25 are gravity biased inwardly toward the centrally located axis 30 when they are stacked in the manner illustrated in FIG. 2.

Figure 2:
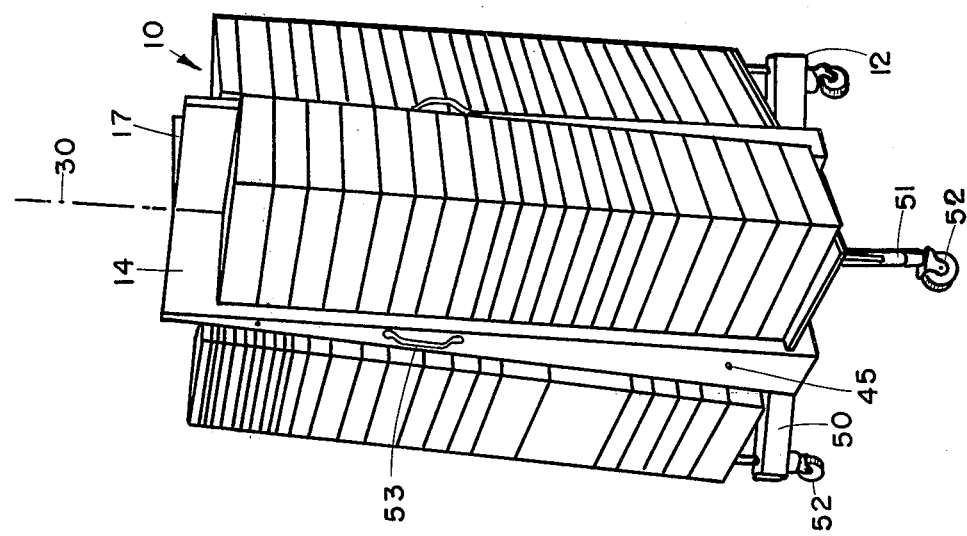
FIG. 2 is a perspective view of the stacking cart of the present invention filled with paper products.
Figure 3:
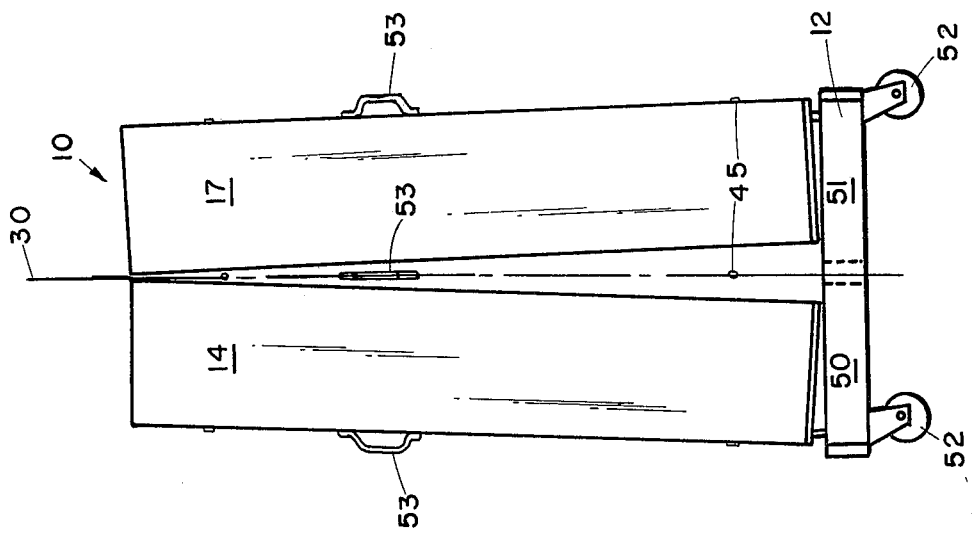
FIG. 3 is a side elevational view of the stacking cart of the present invention.
Figure 7:
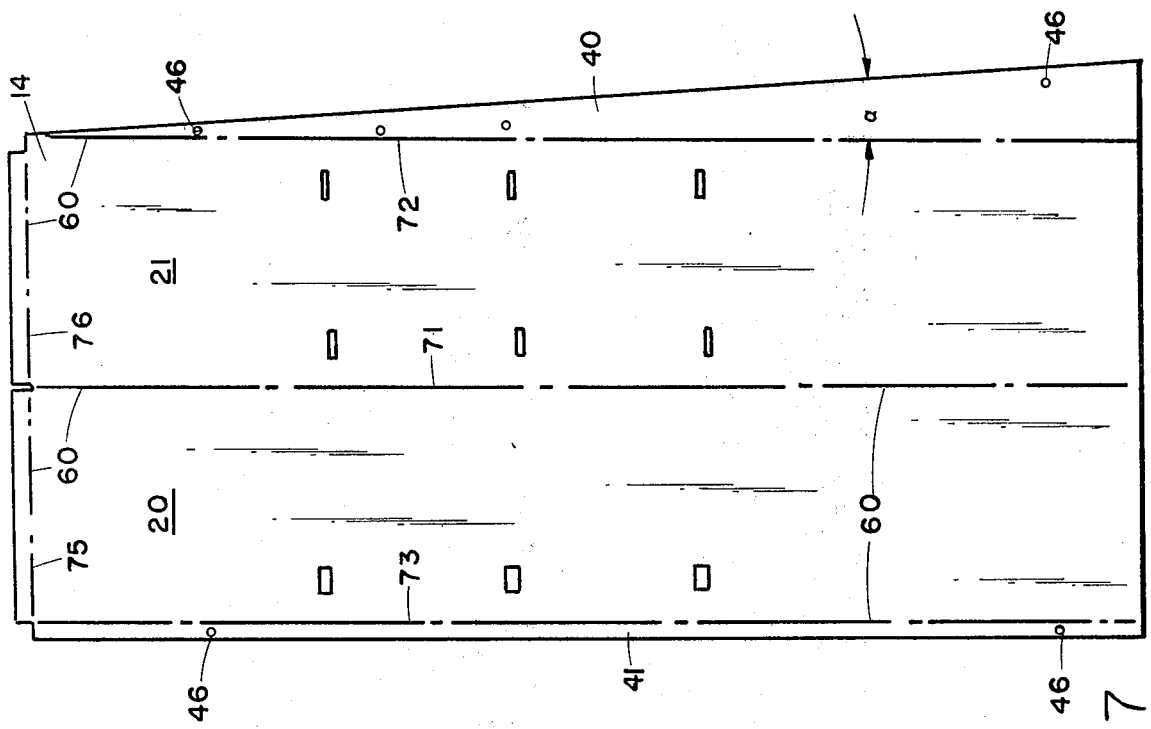
FIG. 7 is a plan view of a sheet metal blank from which the V-shaped troughs of the stacking cart of the present invention are formed.
Figure 4:
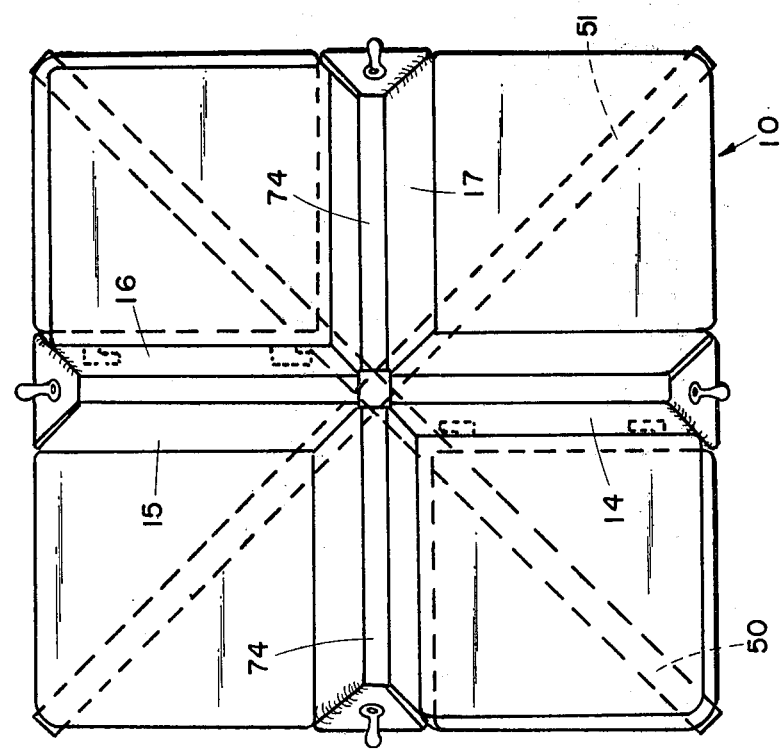
FIG. 4 is a top view of the stacking cart of the present invention.
Figure 9:
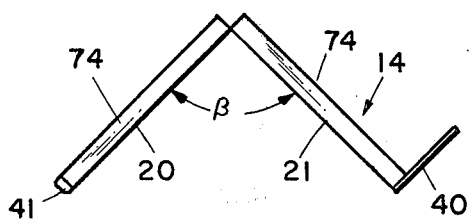
FIG. 9 is a top view of one of the V-shaped troughs.
Figure 8:
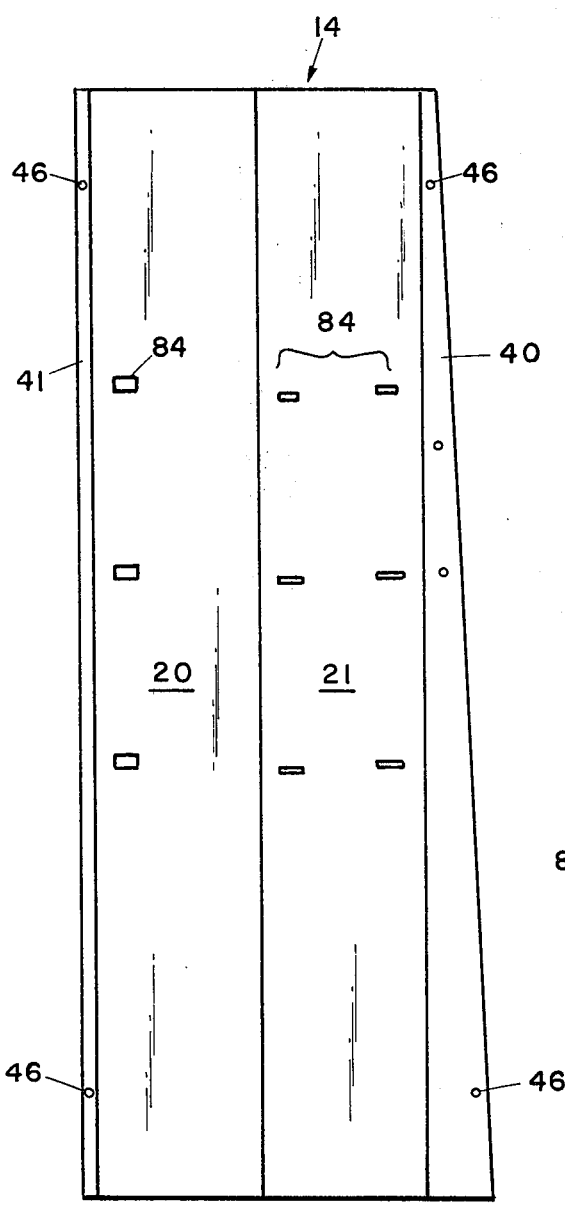
FIG. 8 is a side elevational view of one of the V-shaped troughs of the stacking cart of the present invention.

With particular reference now to FIGS. 8 and 9, a representative V-shaped trough 14 is illustrated in further detail. The means for securing the V-shaped troughs in back-to-back relationship preferably comprises at least one vertically oriented flange 40 disposed on one of the first and second sides 20 and 21 of the V-shaped trough 14. This flange preferably cooperates with a second vertically oriented flange 41 disposed on an adjacent V-shaped trough. The flanges include means for defining a predetermined angle of inclination for the V-shaped troughs relative to the centrally located vertical axis 30 comprising at least one vertically oriented flange such as the flange 40 having a wedge-shape prescribing the predetermined desired angle of inclination of the V-shaped troughs. More particularly, with reference to FIG. 7, which is a plan view of a sheet metal blank from which the V-shaped troughs 14 through 17 are formed, it is illustrated that the first vertical flange 40 prescribes an angle α which is two times the angle of orientation of each of the V-shaped troughs 14 through 17, relative to the centrally located vertical axis 30. Thus, for example, if it is desired to provide each of the V-shaped troughs 14 through 17 with a 13° angle of orientation relative to the centrally located axis 30, the vertically oriented wedge-shaped flange 40 would prescribe an angle of approximately 26°. When the V-shaped troughs 14 through 15 are vertically oriented in a back-to-back relationship, the wedge-shaped vertically oriented first flange 40 and the second vertically oriented flange 41 interrelate with adjacent flanges disposed on adjacent V-shaped troughs to automatically align the troughs in the desired angular orientation. More particularly, first and second flanges 40 and 41 disposed on adjacent vertically oriented V-shaped troughs are disposed in an overlapping fashion with the vertically extending edge of the wedge-shaped flange 40 defining the desired angular orientation of the troughs. The upright troughs are then secured together in any suitable fashion, such as by welding, or by a plurality of through bolts, sheet metal screws 45, or the like, best illustrated in FIGS. 1 through 3, which extend through apertures 46 disposed in each of the V-shaped troughs. As best illustrated in FIGS. 1 through 4, the desired angular orientation for the vertically oriented troughs 14 through 17, is with the tops of the troughs disposed inwardly relative to the bottoms of the troughs and the centrally located axis 30, such that the paper products stacked thereon in the manner illustrated in FIG. 2, are gravity biased inwardly toward the upright vertical axis 30.

The horizontally extending movable stand 12 preferably comprises first and second coplanar, orthogonally extending beams 50 and 51. The beams 50 and 51 are secured together in any suitable fashion, such as for example, by welding. The beams 50 and 51 include a plurality of casters 52 disposed on the ends thereof for facilitating movement of the stand 10. Manipulation of the stand 10 is also facilitated by provision of a plurality of handles 53 bolted or otherwise suitably secured to the first and second vertically oriented flanges 40 and 41 of the V-shaped troughs 14 through 17.

With reference now again to FIGS. 7, 8 and 9, it is illustrated that the V-shaped troughs, such as the trough 14 illustrated in these figures, is preferably formed from a unitary sheet metal blank illustrated in FIG. 7. The blank illustrated in FIG. 7 may, for example, comprise a sheet metal stamping which is provided with the outline illustrated in FIG. 7, and which is folded along the phantom lines 60. Preferably, four V-shaped troughs 14 through 17 are provided since most paper products that are to be stacked are of a rectangular shape. Thus, the sides 20 and 21 of the V-shaped troughs each define a 90° angle $\beta$, best illustrated in FIG. 9. The 90° angle is formed by bending the blank illustrated in FIG. 7 about the centrally located phantom line 71. The first and second vertically oriented flanges 40 and 41 are similarly formed by bending 90° angles along lines 72 and 73. Furthermore, in preferred embodiments, the tops of the V-shaped troughs are provided with overlapping, generally horizontally extending flanges 74, which are formed by bending the blank illustrated in FIG. 7 about 90° lines 75 and 76.

Figure 6:
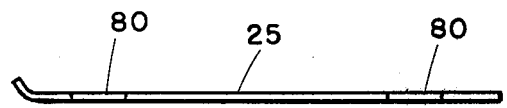
FIG. 6 is a side view of one of the shelves of the stacking cart of the present invention.
Figure 5:
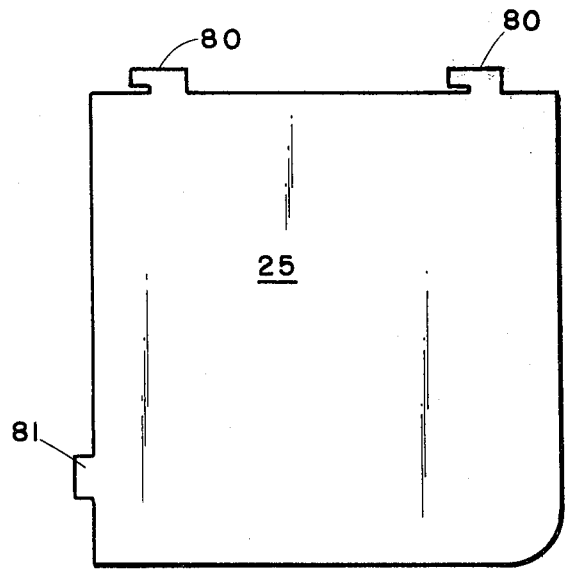
FIG. 5 is a top view of one of the horizontal shelves of the stacking cart of the present invention.

With particular reference now to FIG. 8 and FIGS. 5 and 6, it is illustrated that each of the horizontally extending shelves 25 is provided with means for mounting the shelves such that they extend orthogonally to the sidewalls of the V-shaped troughs comprising a plurality of hooks 80 and at least one tongue 81, which cooperate with apertures 84 disposed in the sides 20 and 21 of the V-shaped troughs for hanging the shelves 25 therefrom. An array of apertures 84 are provided to lend some measure of vertical adjustability to the horizontally extending shelves 25.

The above description is exemplary and that of the preferred embodiment only. The true scope and spirit of the present invention will encompass many modifications of the invention that occur to those who make and use the invention and the true scope and spirit of the present invention should be determined by reference to the appended claims.

The embodiments of the invention in which an exclusive property or privilege is claimed are defined as follows:

1. A stacking cart for sheet material comprising:
   a generally horizontally extending movable stand having a centrally located vertical axis;
   a plurality of vertically oriented, substantially identical, troughs having first and second sides defining a generally V-shaped cross section, said V-shaped trough being disposed on said stand, said V-shaped troughs being provided with top ends and lower ends;
   a plurality of generally horizontally extending shelves disposed in said V-shaped troughs;
   means for mounting said shelves to extend in a direction generally orthogonal to said first and second sidewalls of said V-shaped troughs;
   means for securing said V-shaped troughs in a back-to-back relationship, each of said V-shaped troughs being disposed in an inclined relationship with respect to said centrally located vertical axis, said top ends of said V-shaped troughs being inwardly disposed relative to said lower ends of said troughs, whereby paper products disposed on said shelves are gravity biased inwardly toward said centrally located axis; and
   said means for securing said v-shaped troughs in back-to-back relationship comprising at least one vertically oriented flange disposed on one of said first and second sides of said V-shaped troughs.

2. The stacking cart of claim 1 wherein said means for securing said V-shaped troughs in back-to-back relationship further comprises a second vertically oriented flange disposed on the other of said first and second sides of said V-shaped trough.

3. The stacking cart of claim 2 wherein said first and second flanges include means for defining a predetermined angle of inclination for said V-shaped troughs relative to said centrally located vertical axis.

4. The stacking cart of claim 3 wherein said means for defining a predetermined angle of inclination comprises at least one of said first and second flanges being provided with a wedge-shape, said wedge-shape prescribing said angle of inclination.

5. The stacking cart of claim 4 wherein said V-shaped troughs are each formed from a unitary sheet metal stamping.

6. The stacking cart of claim 5 wherein said V-shaped troughs are secured together in back-to-back relationship by fastener means extending through overlapped first and second vertically oriented flanges.

7. The stacking cart of claim 6 wherein said top ends of said V-shaped troughs are provided with overlapping generally horizontally extending flanges.

8. The stacking cart of claim 1 wherein said horizontally extending movable stand includes a plurality of casters.

9. The stacking of claim 1 wherein said horizontally extending movable stand comprises first and second coplanar orthogonal beams.

10. The stacking cart of claim 1 wherein four of said troughs are provided in a back-to-back relationship each of said V-shaped troughs defining a 90° angle.

11. The stacking cart of claim 1 wherein said means for mounting said shelves comprises a plurality of tongues disposed on said shelves and a plurality of grooves disposed on said V-shaped troughs for hanging said shelves from said V-shaped troughs in a height adjustable tongue and groove manner.

12. The stacking cart of claim 1 wherein at least one handle is disposed on said vertically oriented flanges for facilitating manipulation of said cart.

13. A stacking cart for sheet materials comprising:
 a generally horizontally extending movable stand having a centrally located vertical axis;
 four vertically oriented substantially identical troughs having first and second sides defining a generally V-shaped cross section, said V-shaped troughs being disposed in an upright fashion on said stand, said V-shaped troughs being provided with top ends and lower ends, each of said V-shaped troughs being formed from a unitary sheet metal part with at least one wedge-shaped vertically oriented flange;
 a plurality of generally horizontally extending shelves disposed in said V-shaped troughs; and
 means for securing said V-shaped troughs in a back-to-back relationship, each of said V-shaped troughs being disposed in an inclined relationship with respect to said centrally located vertical axis, the angle of inclination being defined by said wedge-shaped vertical flanges, said top ends of said V-shaped troughs being inwardly disposed relative to said lower ends of said troughs, whereby paper products disposed on said shelves are gravity biased inwardly toward said centrally located axis.

14. The stacking cart of claim 13 wherein each of said V-shaped troughs is provided with one of said wedge-shaped vertically oriented flanges on one side thereof and a second wedge-shaped vertically oriented flange disposed on the other side thereof.

15. The stacking cart of claim 13 wherein said horizontally extending movable stand includes a plurality of casters.

16. The stacking cart of claim 13 wherein said horizontally extending movable stand comprises first and second coplanar orthogonal beams.

17. The stacking cart of claim 13 wherein said four V-shaped troughs are provided with a back-to-back relationship each of said V-shaped troughs defining a 90° angle.

18. The stacking cart of claim 13 wherein at least one handle is disposed on said vertically oriented flanges for facilitating manipulation of said cart.

19. The stacking cart of claim 14 wherein said V-shaped troughs are secured together in back-to-back relationship by fastener means extending through overlapped first and second vertically oriented flanges disposed on adjacent V-shaped troughs.

20. The stacking cart of claim 19 wherein said top ends of said V-shaped troughs are provided with overlapping generally horizontally extending flanges.

21. The stacking cart of claim 13 wherein means for mounting said shelves is provided comprising a plurality of tongues disposed on said shelves and a plurality of grooves disposed on said V-shaped troughs for hanging said shelves from said V-shaped troughs in a height adjustable tongue and groove manner.

* * * * *